(12) United States Patent
Ricci Moretti (10) Patent No.: US 12,110,098 B1
(45) Date of Patent: Oct. 8, 2024

(54) APPARATUS, SYSTEM AND METHOD FOR CONTROL OF ELECTROMECHANICAL BOOST ACTUATORS

(71) Applicant: Piasecki Aircaft Corporation, Essington, PA (US)

(72) Inventor: Luigi U Ricci Moretti, Swarthmore, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 346 days.

(21) Appl. No.: 17/717,415

(22) Filed: Apr. 11, 2022

Related U.S. Application Data

(63) Continuation-in-part of application No. 16/873,559, filed on May 4, 2020, now abandoned.

(60) Provisional application No. 63/100,758, filed on Mar. 30, 2020.

(51) Int. Cl.
*B64C 13/50* (2006.01)
*B64C 13/30* (2006.01)

(52) U.S. Cl.
CPC .............. *B64C 13/50* (2013.01); *B64C 13/30* (2013.01)

(58) Field of Classification Search
CPC ....... B64C 13/50; B64C 13/30; B64C 13/505; B64C 13/506
See application file for complete search history.

(56) References Cited

U.S. PATENT DOCUMENTS

| | | |
|---|---|---|
| 2008/0156939 A1 | 7/2008 | Hanlon |
| 2012/0032031 A1 | 2/2012 | Grohmann |
| 2017/0335916 A1 | 11/2017 | Fox |

FOREIGN PATENT DOCUMENTS

| | | |
|---|---|---|
| EP | 1211427 | 5/2002 |
| WO | 2018220554 | 6/2018 |

*Primary Examiner* — Rodney A Bonnette
(74) *Attorney, Agent, or Firm* — Robert J. Yarbrough of Lipton, Weinberger & Husick (57) ABSTRACT

An electromechanical boost actuator for aircraft flight control is attached to a mechanical input by a mechanical linkage. The mechanical linkage is also attached to the output shaft of the electromechanical boost actuator. When a pilot or control system manually moves the mechanical input, a position sensor attached to the linkage activates electric motor(s), extending or retracting the output shaft in the direction commanded by the pilot or control system. The motion of the output shaft, acting through the linkage, moves the position sensor to a neutral position, stopping the electric motor(s) and the output shaft when the output shaft reaches the commanded position. Additional linear actuators may inject another control signal in conjunction with the mechanical input.

12 Claims, 7 Drawing Sheets

APPARATUS, SYSTEM AND METHOD FOR CONTROL OF ELECTROMECHANICAL BOOST ACTUATORS

I. BACKGROUND OF THE INVENTION

A. Field of the Invention

The Invention is an apparatus, system and method to control an electromechanical boost actuator for control of an aircraft. The boost actuator amplifies the mechanical power applied by the pilot or control system to move flight controls in a redundant, fault-tolerant manner and without relying upon hydraulic systems.

B. Description of the Related Art

As used in this document, an 'aircraft' is a rotary wing aircraft, a fixed wing aircraft or a compound aircraft. A compound aircraft is an aircraft that has features of both a rotary wing aircraft and a fixed wing aircraft, such as a both a rotor and a wing for lift or both a rotor and a propeller for thrust. An aircraft may have flight controls, such as cyclic and collective pitch of the rotor(s) of a rotary wing aircraft or the ailerons, flaperons, flaps, elevator, rudder, or other control surfaces of a fixed wing aircraft, or the aircraft landing gear or brakes, all of which are referred to herein collectively as 'flight controls.' The compound aircraft may have any combination of the flight controls of both a rotary wing aircraft and a fixed wing aircraft. The term 'flight controls' also means any other control of an aircraft when the aircraft is in flight and when the aircraft is not in flight.

To control the aircraft during flight, a pilot moves inceptors, such as a stick, pedals or a yoke. For some aircraft, particularly small aircraft, the inceptors may be connected to and move flight controls directly by mechanical linkages such as rods or cables. As aircraft increase in size, the flight controls also increase in size and the force required to move the flight controls also increases, and may increase beyond the force that a human pilot may feasibly apply using mechanical linkages.

The inceptors, particularly for larger aircraft, may be operably attached to boost actuators that translate the motion of the inceptor by the pilot to corresponding motion of the aircraft flight controls. Boost actuator systems may be hydraulic or electromechanical. A hydraulic boost actuator system comprises hydraulic pumps, tubing, valves and hydraulic cylinders or other hydraulic actuators to move the flight controls. Because of complexity and opportunities for failure, hydraulic systems require substantial redundancy and are heavy, reducing the payload or capabilities of the aircraft. Hydraulic systems also continuously rob power from the aircraft engines to operate the hydraulic pumps.

An electromechanical actuator (EMA) may include an electric motor that drives a jackscrew, a corresponding nut, or other apparatus for linear motion, resulting in linear motion to move the flight controls. An example electromechanical boost actuator for use in aircraft is supplied by UmbraGroup S.p.A, Via V. Baldaccine 1, 06034 Foigna (PG), Italy and addressed by U.S. Pat. No. 11,105,404 to Bolgarelli issued Aug. 31, 2021. The UmbraGroup electromechanical boost actuator includes an output shaft. The boost actuator selectably moves the output shaft in a linear fashion along a shaft longitudinal axis when electrical power is supplied to two redundant electrical motors.

The prior art does not teach the electromechanical actuator motor control and pilot feedback apparatus, system and method of the Invention.

II. SUMMARY OF THE INVENTION

The Invention is an electromechanical system, apparatus and method for accepting a mechanical input from a pilot of an aircraft using an inceptor, such as a stick, pedal, or yoke, for activating the electric motor(s) of an electromechanical boost actuator in response to the mechanical input, and for ceasing the activation of the electric motor(s) when the electromechanical actuator and hence the flight control operated by the electromechanical actuator has reached the position commanded by the pilot or by a control system.

The apparatus and system of the Invention may include an electromechanical linear boost actuator, such as an Umbra-Group electromechanical linear actuator. The linear actuator has an output shaft that is extendable and retractable along a shaft longitudinal axis by at least one electric motor. When connected to a flight control of an aircraft, the extended position, retracted position, and intermediate position of the output shaft determines the position of the flight control that is attached to the electromechanical linear boost actuator.

As explained in detail below, the Invention includes a bar linkage having at least three bars that are attached together: an output shaft bar, a pivoting bar, and a floating bar. The output shaft bar is attached to the output shaft of the electromechanical actuator and moves with the output shaft. The output shaft bar is also attached to the floating bar. The pivoting bar is attached to and is rotatable about a fixed pivot location and engages the floating bar intermediate to the ends of the floating bar. A mechanical input, as from a pilot's inceptor or from a control system, is attached to the floating bar.

Movement of either the mechanical input or the output shaft will move the floating bar and hence will rotate the pivoting bar. A position sensor is attached to and monitors the angular position of the pivoting bar about the fixed pivot location. The position sensor is operably attached to a motor controller, electrical power supply and the electric motor(s) of the electromechanical actuator. When the pilot or a control system applies a command in the form of a mechanical input in a first direction, motion of the pivoting bar and hence the position sensor causes the electric motor(s) to move the output shaft of the electromechanical actuator. When the output shaft, and hence the flight control attached to the output shaft, reaches the position commanded by the pilot or control system, the pivoting bar and hence the position sensor has returned to its original neutral position, cutting power to the electric motor(s) and stopping the motion of the output shaft with the flight control in the commanded position.

The output shaft bar also may comprise one or more linear actuators configured change the length of the output shaft bar to electrically control the operation of the electric motor(s), as by an aircraft stability control system, or to bias the position sensor.

IV. DESCRIPTION OF AN EMBODIMENT

From FIGS. 1-5, an electromechanical linear boost actuator 2 has an output shaft 4 that is extendable and retractable along a shaft longitudinal axis 6 by at least one electric motor 8. The output shaft 4 is operably attached to a flight control of an aircraft. The output shaft 4, and hence the flight control, is movable between a retracted position 10 (shown by FIG. 3) an extended position 12 (shown by FIG. 5) and intermediate positions 14 (shown by FIGS. 1 and 2). The extended position 12, retracted position 10, and intermediate position 14 of the output shaft 4 determines the position of the flight control of the aircraft.

Figure 1:
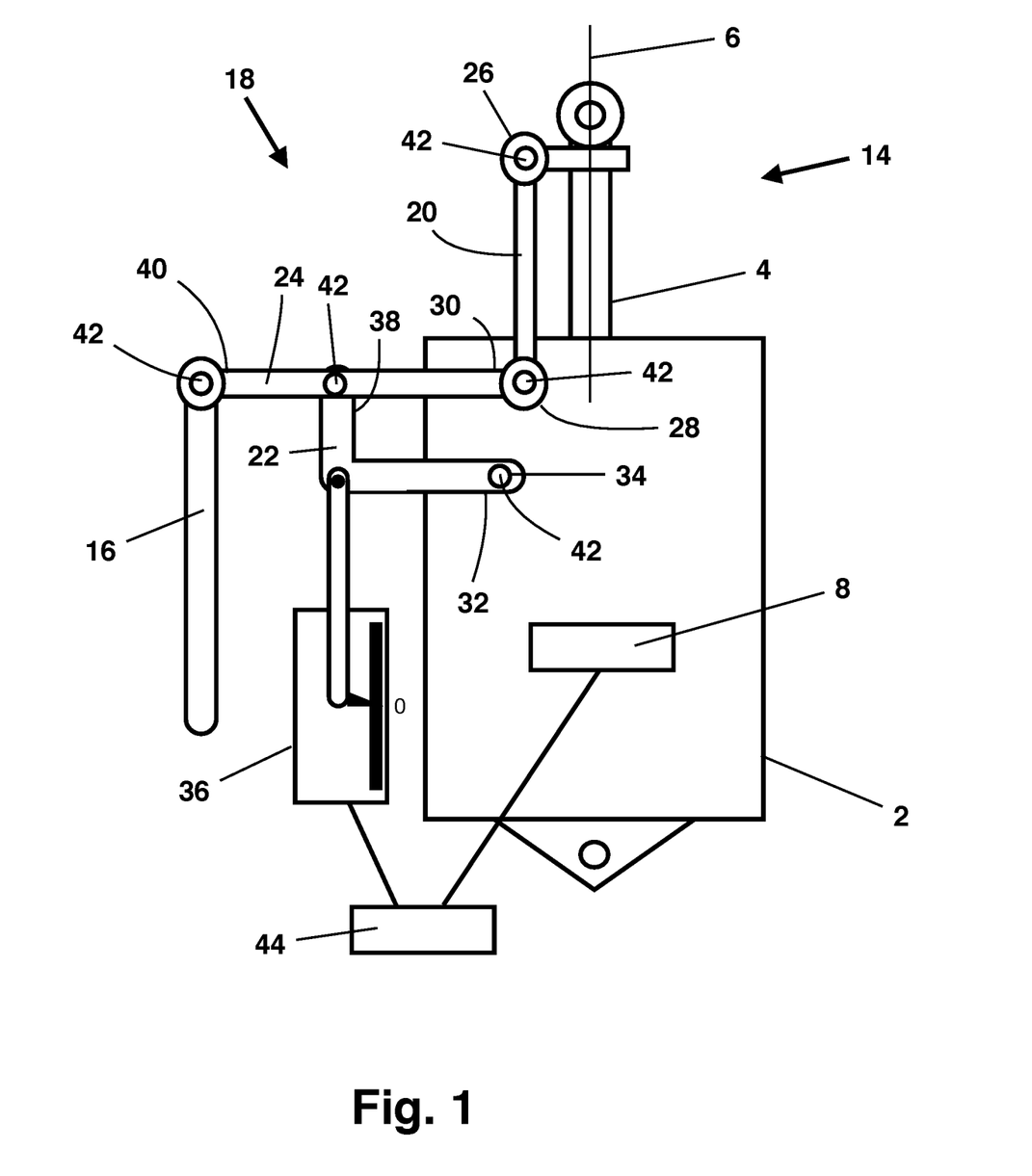
FIG. 1 is a schematic view of the mechanical control apparatus and system of the Invention at a first time with the mechanical input and the output shaft in a neutral position.

FIG. 1 shows the apparatus at a first time with the output shaft 4 in an intermediate position 14. A mechanical input 16 can move in response to a manual pilot or control system command, as by motion of an inceptor, cables or rods to command motion of the boost actuator 2 and hence the flight control. In FIG. 1, the mechanical input 16 is initially in a neutral position and not applying a command to the boost actuator 2.

From FIG. 1, a three-bar linkage 18 has at least an output shaft bar 20, a pivoting bar 22, and a floating bar 24. The output shaft bar first end 26 is attached to the output shaft 4 of the electromechanical actuator 2 and is hinged for rotation. The output shaft bar first end 26 moves with the output shaft 4 as the output shaft 4 moves between the extended, retracted and intermediate positions 12, 10, 14. The output shaft bar second end 28 is rotatably attached to the floating bar first end 30. The output shaft bar second end 28 moves the floating bar first end 30 as the output shaft 4 moves between the extended 12, retracted 10 and intermediate 14 positions.

From FIG. 1, the pivoting bar first end 32 pivots about a fixed pivot location 34. The fixed pivot location 34 may be on the housing of the electromechanical actuator 2 and does not move when the output shaft 4 moves or the mechanical input 16 moves. The pivoting bar 22 is operably attached to a position sensor 36. The position sensor 36 may utilize any technology known in the art to detect the rotational position of the pivoting bar 22 about the fixed pivot location 34. For example, the position sensor 36 may be a rotary or linear rheostat. Alternatively, the sensor 36 may be a capacitive displacement sensor, an eddy current sensor, a Hall effect sensor, an inductive sensor, a linear variable differential transformer, a photodiode array, a piezo-electric sensor, a position encoder, an electromagnetic proximity sensor, a string potentiometer, an ultrasonic sensor, or any other sensor known in the sensor art and capable of determining linear or rotational displacement of the pivoting bar 22. In FIG. 1, the position sensor 36 is in a neutral position (indicated by 'o' in FIGS. 1-5). The position sensor 36 is operably attached to a motor controller 44, which is operably attached to the at least one electric motor 8. As described below with respect to FIGS. 2-5, the motor controller 44 is configured to energize the electric motor 8 when the position sensor 36 moves from the neutral position shown by FIG. 1, indicating that the pivoting bar 22 has rotated about the fixed pivot location 34.

FIG. 1 also shows that the pivoting bar second end 38 is attached for rotation to the floating bar 24 intermediate to the floating bar first end 30 and floating bar second end 40. The floating bar second end 40 is mechanically attached to the mechanical input 16 operated by the pilot or by a control system. The mechanical input 16 is illustrated as a rod, but may be a rod, a cable, a linkage, or any other apparatus known in the art to transfer mechanical movement. Each of the connections between the output shaft bar 20 to the output shaft 4, between the output shaft bar 20 and the floating bar 24, between the floating bar 20 and the pivoting bar 22, between the floating bar and the mechanical input 16, and between the pivoting bar 22 and the fixed pivot location 34 may be rotatable pin connections 42 in which the axes of rotation 43 of the pin connections 42 are parallel so that the bars 20, 22 and 24 are rotatable in the same mathematical plane or in parallel planes, avoiding binding of the bars 20, 22, 24 and pin connections 42.

Figure 2:
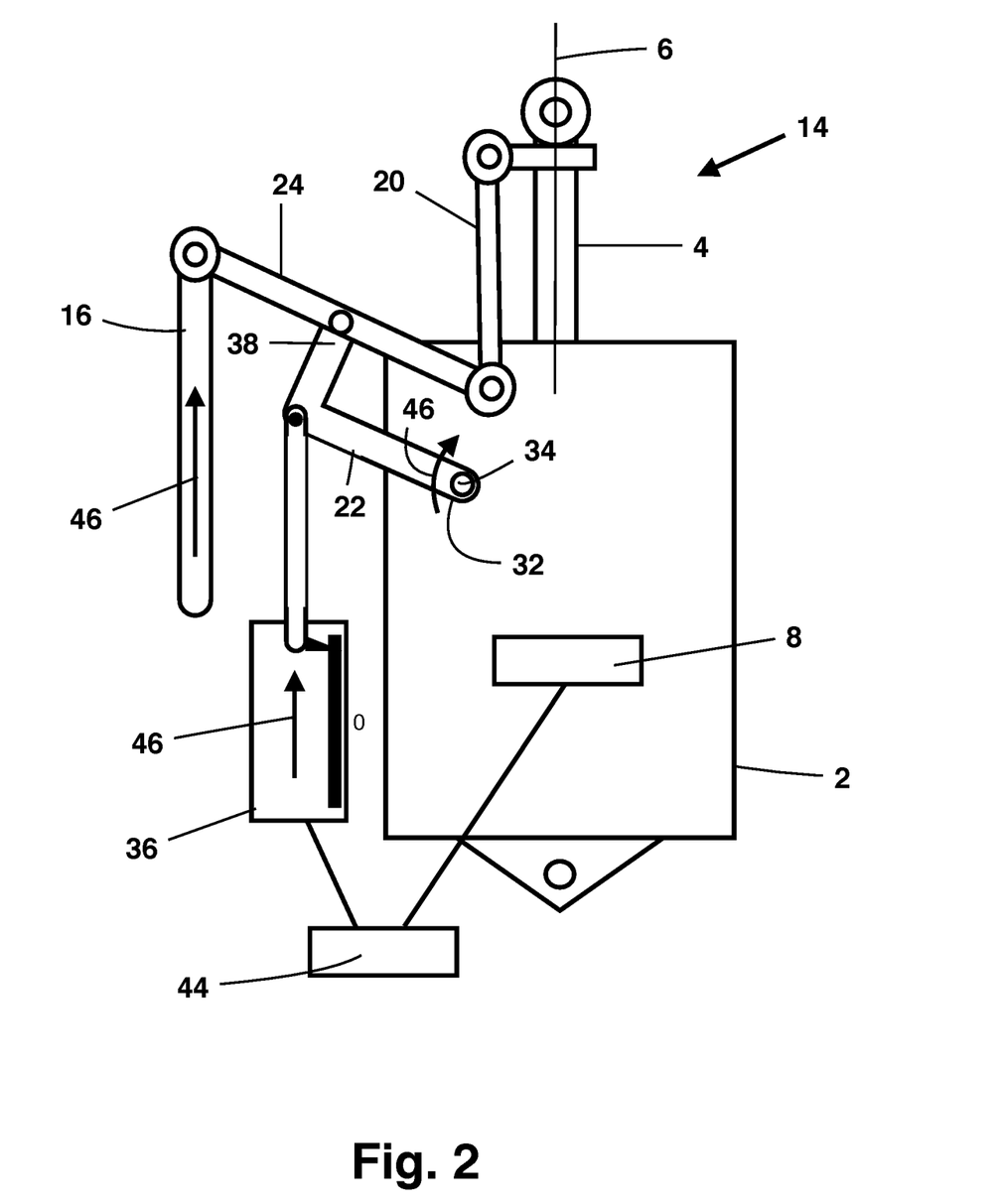
FIG. 2 is a view of the apparatus of FIG. 1 at a second time, which is after the first time, and when the control apparatus has received a mechanical command.
Figure 3:
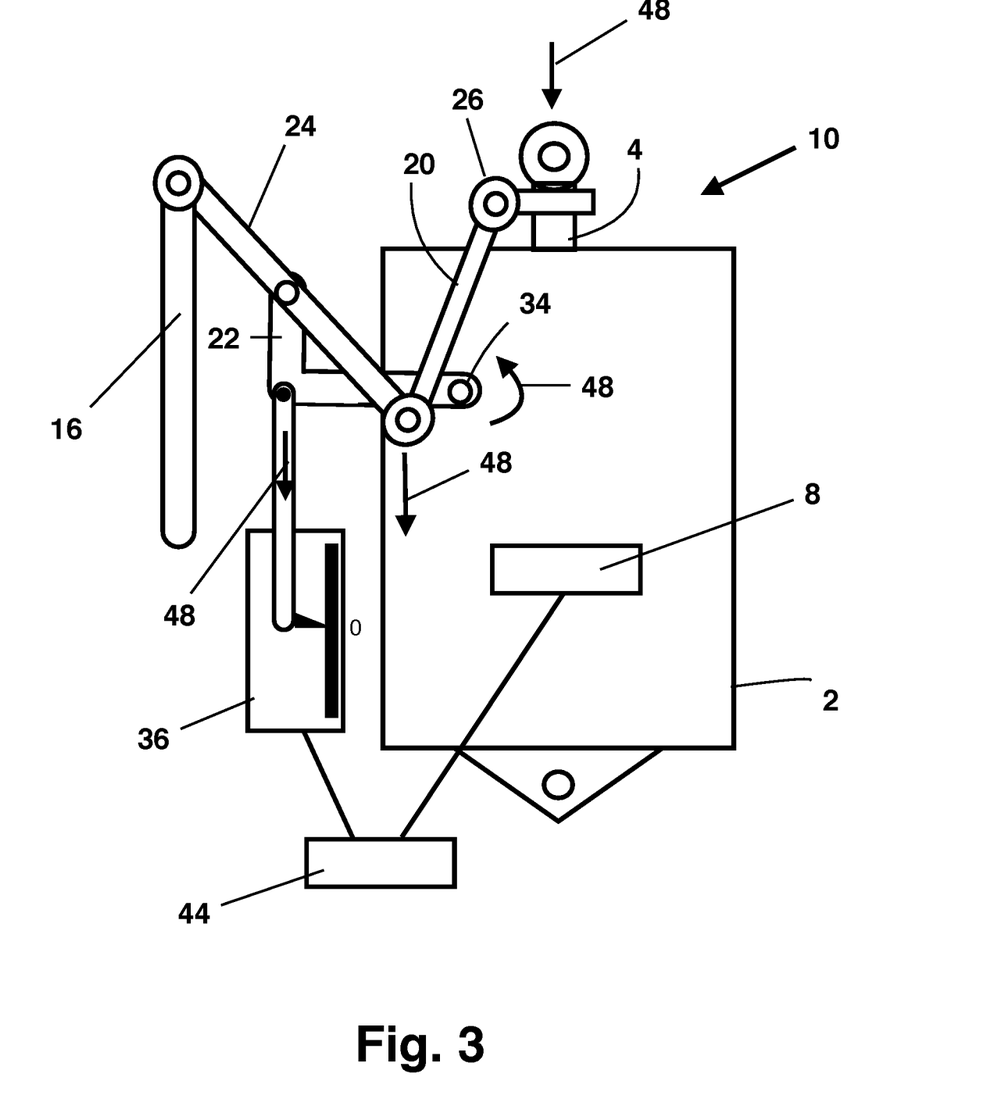
FIG. 3 is a view of the mechanical control apparatus and system of FIG. 2 at a third time, which is after the second time, and when the electromechanical actuator has responded to the mechanical command.

FIGS. 2 and 3 show the response of the apparatus to a first command from the pilot or control system through the mechanical input 16, starting from the neutral position shown by FIG. 1. From FIG. 2, the pilot moves the mechanical input 16 in a first direction 46 to command a change in position of the flight control corresponding to the retracted position 10 of the output shaft 4. The mechanical input 16 moves the floating bar second end 40 in the first direction 46 generally parallel to the output shaft longitudinal axis 6. The motion of the floating bar 24 moves the pivoting bar second end 38 in the first direction 46. The pivoting bar 22 rotates in the first direction 46 about the fixed pivot location 34 to a first displaced position. The position sensor 36 detects the motion of the pivot bar 22 in the first direction 46 and away from a neutral position and to the first displaced position. The position sensor 36 informs the motor controller 44 of the displacement of the pivoting bar 22. As described relating to FIG. 3 below, the motor controller 44 powers the motor(s) 8 to move the output shaft 4 in a second direction 48 opposite to the first direction 46, moving the flight control to which the electromechanical actuator 2 is attached.

FIG. 3 shows the actions of the apparatus in response to the control input of FIG. 2. The motor controller 44 responds by energizing the electric motor(s) 8, causing the electric motor(s) 8 to move the output shaft 4 in a second direction 48 opposite to the first direction 46. The output shaft 4 moves in the second direction 48 toward the retracted position 10, moving the output shaft bar 20 in the second direction 48. The output shaft bar 20 moves the floating bar 24 in the second direction 48, which causes the pivoting bar 22 to move in the second direction 48 and to pivot in the second direction 48 about the pivot location 34. The rotation of the pivoting bar 22 in the second direction 48 returns the position sensor 36 to the neutral position, indicated by 'o' on FIG. 3. The motor controller 44, informed by the position sensor 36, stops the electric motor(s) 8 and the output shaft 4 and hence the flight control attached to the output shaft 4 in the retracted position 10 commanded by the pilot when the pilot moved the inceptor. The output shaft 4 and hence the flight control to which the output shaft 4 is connected stop in the retracted position 10 commanded by the pilot.

Figure 4:
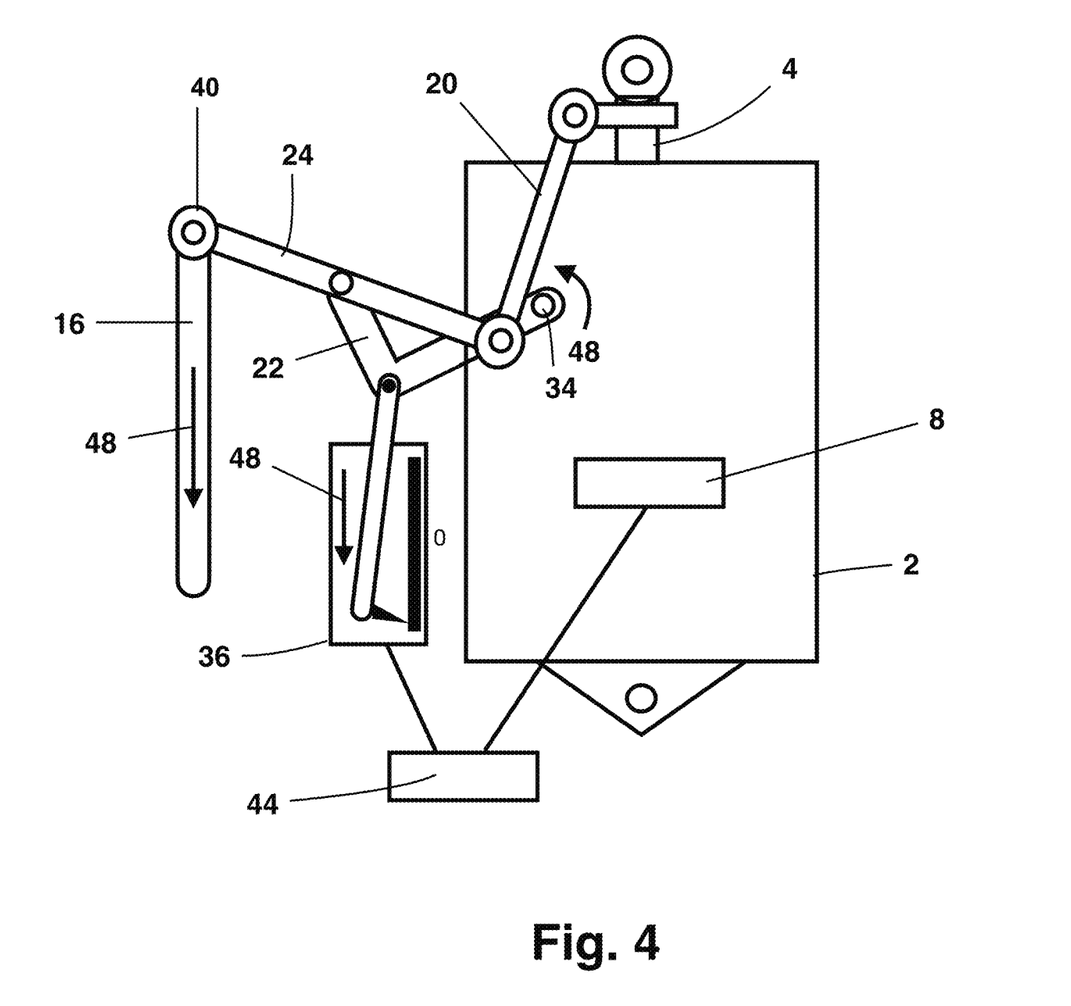
FIG. 4 is a view of the apparatus of FIG. 3 at a fourth time, which is after the third time, and when the apparatus has received a second command.
Figure 5:
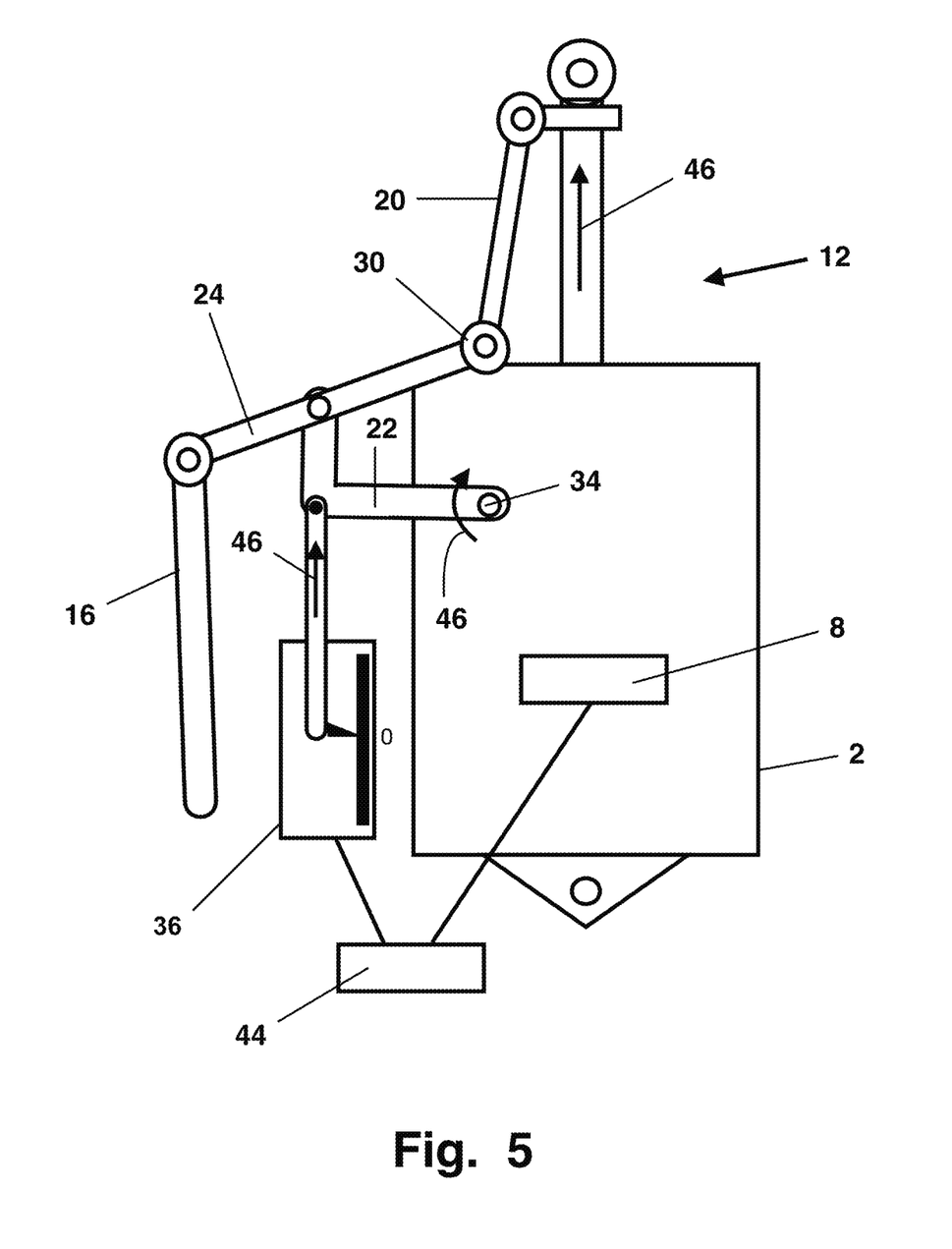
FIG. 5 is a view of the apparatus of FIG. 4 at a fifth time, which is after the fourth time, and when the apparatus has responded to the second command.

FIGS. 4 and 5 show the effect of moving the mechanical input 16 by the pilot or by a control system to a position corresponding to the extended position 12 of the output shaft 4 and the flight control to which the output shaft 4 is attached, starting from the position of the mechanical input 16 and the output shaft 4 shown by FIG. 3. From FIG. 4, the pilot moves the mechanical input 16, causing the floating bar second end—40—to move in the second direction 48. The floating bar 24 moves the pivoting bar 22 in the second direction 48, rotating the pivoting bar 22 in the second direction 48 and away from its neutral position and to a second displaced position. The position detector 36 detects the motion of the swiveling bar 22 away from the neutral position and to the second displaced position and informs the motor controller 44, which causes the electric motor(s) 8 to move the output shaft 4 in the first direction 46 opposite to the second direction 48, shown by FIG. 5.

From FIG. 5, the motion of mechanical input 16 shown by FIG. 4 causes the output shaft 4 to move in the first direction 46, which moves the floating bar first end 30 in the first direction 46. Motion of the floating bar 24 moves the pivoting bar 22 in the first direction 46, away from the second displaced position and returning the pivoting bar 24 to the neutral position. The position sensor 36 detects the return of the pivoting bar 24 to the neutral position and stops the electric motor(s) 8. The output shaft 4 and hence the flight control to which the electromechanical actuator 2 is attached are now in the extended position 12 commanded by the pilot. The apparatus may move the output shaft 4 and hence the flight control to which the output shaft 4 is attached to any position commanded by the pilot intermediate to the retracted 10 and extended positions 12.

Figure 6:
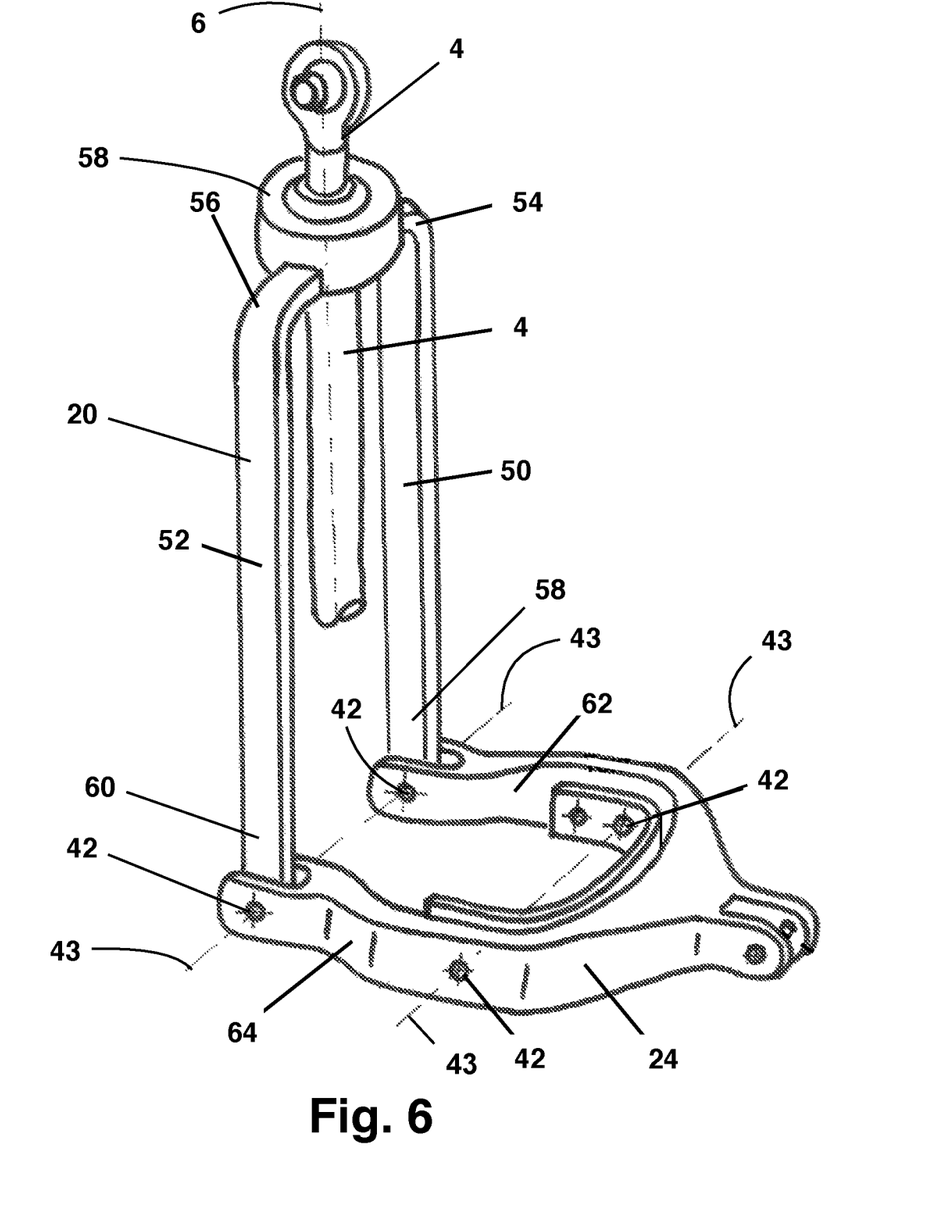
FIG. 6 is a view of the apparatus having dual load pathways for mechanical reliability and does not show the pivoting bar or the position sensor.
Figure 7:
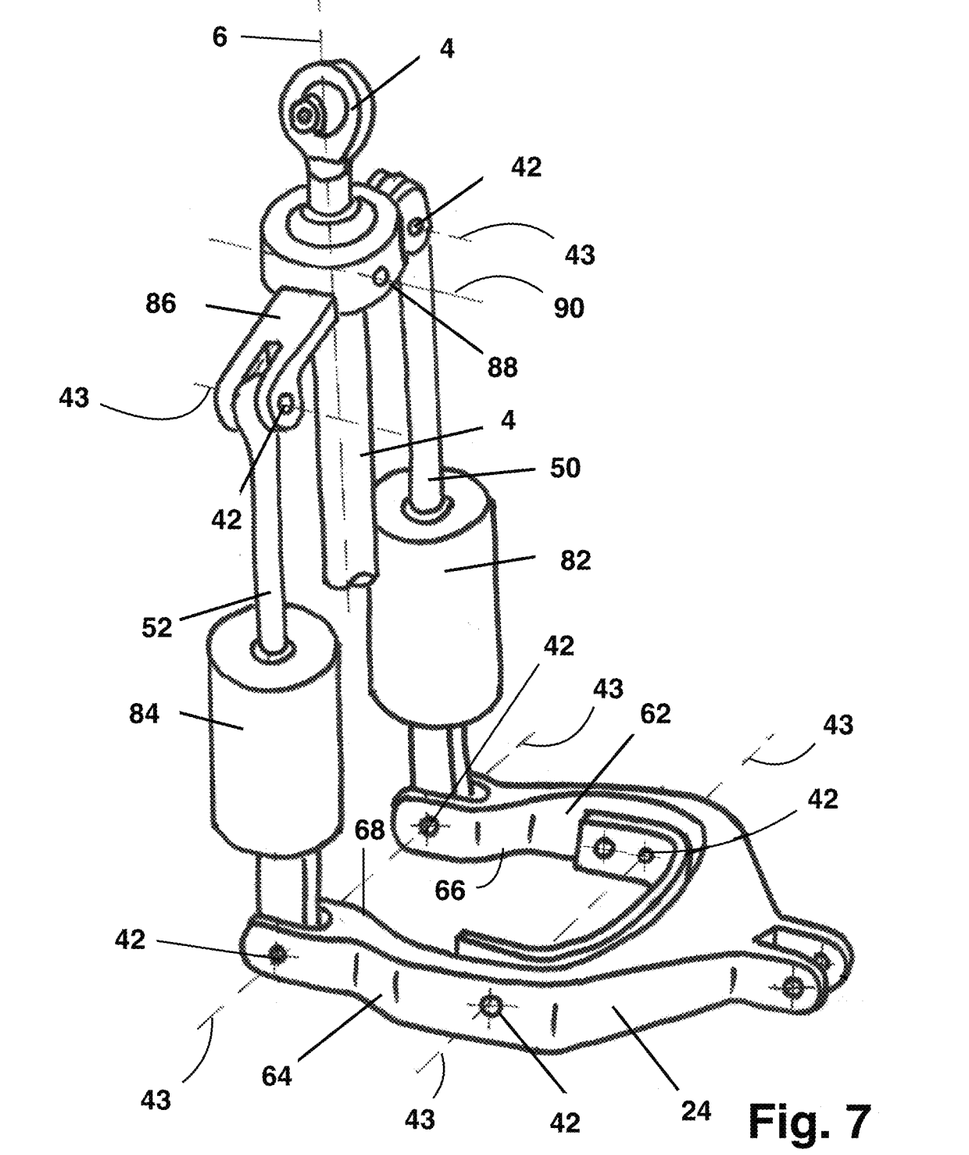
FIG. 7 is a view of the apparatus of FIG. 6 having redundant linear actuators to adjust the length of the output shaft bar.

FIGS. 6 and 7 are an embodiment of the mechanical linkage of FIGS. 1 through 5 having a configuration to conform to a generally cylindrical electromechanical linear boost actuator 2 and having redundant mechanical load paths for mechanical reliability in a flight control application. In the example of FIGS. 6 and 7, the output shaft bar 20 is generally U-shaped, with a first output shaft bar 50 and a second output shaft bar 52. The first ends 54, 56 of the first output shaft bars 50, 52 are rotatably attached to the output shaft 4, as by a ball connection 58.

FIGS. 6 and 7 do not show the pivoting bar 22, the fixed pivot location 34 or the position sensor 26 of FIGS. 1-5.

The floating bar 24 is substantially U-shaped with a first floating bar 62 and a second floating bar 64. The first floating bar 62 has a first floating bar first end 66. The second floating bar 64 has a second floating bar first end 68. The first and second floating bar first ends 66, 68 are rotationally attached to the first and second output shaft bar second ends 58, 60 by pin connections 42 having pin axes of rotation 43.

The rotatable connections between the output shaft bars 20, the floating bars 24 and the pivoting bars 22 are pin connections 42 and the axes of rotation of the pin connections 43 are parallel. Some or all of the first and second output shaft bars 50, 52 and floating bars 62, 64 may be split to provide two independent mechanical load paths for flight control redundancy and reliability.

FIG. 7 is a view of the apparatus of FIG. 6 having a first and a second linear actuator 82, 84 to adjust the length of the first and second output shaft bars 50, 52. The first and second linear actuators 82, 84 allow injection of a second control signal to control the electromechanical boost actuator 2 output simultaneously with the mechanical input 16. For example, the secondary control signal to the first and second linear actuators 82, 84 may be generated from an automated aircraft stabilization system.

The two linear actuators 82, 84 provide redundancy. During normal operation, both actuators 82, 84 extend and retract simultaneously for the same distance and in the same direction. By doing so, the actuators 82, 84 modify the kinematic relationships of the feedback mechanism and modify the equilibrium position of the position sensor 36, changing the output of the electromechanical boost actuator 2 without affecting the mechanical input 16. In case of malfunction of one of the linear actuators 82, 84, the failed actuator 82, 84 is fixed in position. A teetering joint 86 pivots about teetering pin connection 88 with a teetering axis of rotation 90. The teetering joint 86 links the output of the two actuators 82, 84. With the failed actuator 82, 84 in a fixed position, the remaining functional actuator 82, 84, acting through the teetering joint 86, may continue to adjust the length of the first or second output shaft bar 50, 52 to allow injection of the second control signal to control the electromechanical boost actuator 2. This feature provides the ability to accommodate single actuator 82, 84 lock or runaway failures through differential operation of the two actuators 82, 84, thereby insuring redundancy.

The Invention may provide safer, simpler and lower cost electromechanical boost actuators 2 with electromechanical feedback of aircraft controls that can operate without fly-by-wire systems. The Invention also may allow control the electromechanical boost actuator 2 through a primary and a secondary channel, where the primary is a mechanical input 16 and the secondary can be the output of an aircraft automatic stabilization system to the linear actuators 82, 84.

The following is a list of numbered elements from the drawings and specification.

An electromechanical boost actuator 2
An output shaft 4
An output shaft longitudinal axis 6
At least one electric motor 8
A retracted position 10
An extended position 12
An intermediate position 14
Mechanical input 16
Bar linkage 18
An output shaft bar 20
A pivoting bar 22
A floating bar 24
An output shaft bar first end 26
An output shaft bar second end 28
A floating bar first end 30
A pivoting bar first end 32
A fixed pivot location 34
A position sensor 36
A pivoting bar second end 38
A floating bar second end 40
A pin connection 42
Axes of rotation 43 (of the pin connections)
A motor controller 44
A first direction 46
A second direction 48
A first output shaft bar 50
A second output shaft bar 52
First output shaft bar first end 54
Second output shaft bar first end 56
First output shaft bar second end 58
Second output shaft bar second end 60
A first floating bar 62
A second floating bar 64

First floating bar first end 66
Second floating bar first end 68
A first linear actuator 82
A second linear actuator 84
A teetering joint 86

What is claimed is:

1. A control apparatus for a boost actuator having an output shaft, the control apparatus comprising:
   a) an output shaft bar, the output shaft bar having an output shaft bar first end and an output shaft bar second end, the output shaft bar first end being rotatably attached to the output shaft of the boost actuator, the output shaft having a longitudinal axis, the boost actuator having at least one electric motor having a configuration to selectably move the output shaft between a retracted position, an extended position and an intermediate position along the output shaft longitudinal axis;
   b) a floating bar having a floating bar first end and a floating bar second end, the output shaft bar second end being rotatably attached to the floating bar first end;
   c) a mechanical input, the mechanical input having a configuration for attachment to the floating bar and to selectably move the floating bar second end in a first or a second direction, the first and second directions being generally parallel to the output shaft longitudinal axis, the first and second directions being substantially opposing;
   d) a pivoting bar, the pivoting bar having a pivoting bar first end and a pivoting bar second end, the pivoting bar first end being attached to and configured for rotation about a fixed pivot location, the fixed pivot location being stationary with respect to the boost actuator, the pivoting bar second end being rotatably attached to the floating bar in a spaced-apart relation to the floating bar first end;
   e) a position detector, the position detector being configured to detect an angular position of the pivoting about the fixed pivot location;
   f) a motor controller, the position detector being operably attached to the motor controller, the motor controller being operably attached to the at least one electric motor.

2. The control apparatus of claim 1 wherein the configuration of the electric motor to selectably move the output shaft comprising: the pivoting bar having a neutral location in which the motor controller does not cause the at least one electric motor to move the output shaft, the position sensor being configured to detect whether the pivoting bar is in the neutral location.

3. The control apparatus claim 2 wherein the configuration of the electric motor to selectably move the output shaft further comprising: the pivoting bar having a first displaced position in which the pivoting bar is displaced in the first direction from the neutral position, the pivoting bar having a second displaced position in which the pivoting bar is displaced in the second direction from the neutral position, the motor controller being configured to cause the motor to move the output shaft in the second direction when the pivoting bar is in the first displaced position, the motor controller being configured to cause the motor to move the output shaft in the first direction when the pivoting bar is in the second displaced position.

4. The control apparatus of claim 3 in which each of the following rotatable connections is a pin connection having a pin axis of rotation and in which all of the pin axes of rotation are substantially parallel:
   a) between the output shaft bar first end to the output shaft;
   b) between the output shaft bar second end to the floating bar first end;
   c) between the floating bar and the pivoting bar second end; and
   d) between the pivoting bar first end and the fixed pivot location is a first pin connection.

5. The control apparatus of claim 1 wherein the mechanical input comprises a mechanical linkage or a mechanical cable.

6. The control apparatus of claim 1 wherein the at least one electric motor comprises a pair of redundant electric motors.

7. The control apparatus of claim 1 wherein the apparatus further comprises: a redundant mechanical load path between the output shaft and the mechanical input.

8. The control apparatus of claim 7 wherein the redundant mechanical load path comprises: a first output shaft bar and a second output shaft bar.

9. The control apparatus of claim 8 wherein the first and the second output shafts are separate.

10. The control apparatus of claim 9 wherein the first output shaft bar comprises: a first linear actuator, the first linear actuator being configured to selectably change a distance between the first output shaft bar first end and the first output shaft bar second end.

11. The control apparatus of claim 10 wherein the second output shaft bar comprises: a second linear actuator, the second linear actuator being configured to selectably change a distance between the second output shaft bar first end and the second output shaft bar second end.

12. The control apparatus of claim 1 wherein the output shaft bar comprises: a linear actuator, the linear actuator being configured to selectably change a distance between the output shaft bar first end and the output shaft bar second end.

* * * * *